US011636401B2

(12) United States Patent
Dhingra et al.

(10) Patent No.: US 11,636,401 B2
(45) Date of Patent: Apr. 25, 2023

(54) ARTIFICIAL INTELLIGENCE PLATFORM

(71) Applicant: Noodle.ai, San Francisco, CA (US)

(72) Inventors: Deepinder Singh Dhingra, Bangalore (IN); Ganesh Moorthy, Bangalore (IN); Praveen Singh, Karnataka (IN); Sarfaraj Ahmad, Jharkhand (IN); Arijit Saha, Bengaluru (IN); Kumar Srivastava, Mountain View, CA (US); Sourabh Chourasia, Bangalore (IN); Ted Gaubert, Plano, TX (US)

(73) Assignee: NOODLE.AI, San Francisco, CA (US)

( * ) Notice: Subject to any disclaimer, the term of this patent is extended or adjusted under 35 U.S.C. 154(b) by 999 days.

(21) Appl. No.: 16/411,523

(22) Filed: May 14, 2019

(65) Prior Publication Data

US 2020/0242516 A1 Jul. 30, 2020

(30) Foreign Application Priority Data

Jan. 25, 2019 (IN) .............................. 201941003173

(51) Int. Cl.
| G06F 3/048 | (2013.01) |
| G06N 20/20 | (2019.01) |
| G06N 5/043 | (2023.01) |
| G06F 9/54 | (2006.01) |
| G06F 8/36 | (2018.01) |

(52) U.S. Cl.
CPC ............... *G06N 20/20* (2019.01); *G06F 8/36* (2013.01); *G06F 9/54* (2013.01); *G06N 5/043* (2013.01)

(58) Field of Classification Search
CPC .......... G06N 20/20; G06N 5/043; G06F 8/36; G06F 9/54
See application file for complete search history.

(56) References Cited

U.S. PATENT DOCUMENTS

| 10,997,717 | B2 * | 5/2021 | Ceccaldi | ................... G06T 7/10 |
| 11,163,621 | B1 * | 11/2021 | Park | .................... G06F 21/6227 |
| 11,194,968 | B2 * | 12/2021 | Büttner | ................. G06N 3/088 |
| 11,237,804 | B2 * | 2/2022 | Schmidt | ................... G06F 8/36 |
| 11,288,456 | B2 * | 3/2022 | Batra | ..................... G06N 20/20 |
| 11,481,553 | B1 * | 10/2022 | Durvasula | ............. G06F 40/279 |

(Continued)

*Primary Examiner* — David Phantana-angkool
(74) *Attorney, Agent, or Firm* — IceMiller LLP

(57) ABSTRACT

An AI platform to enable one or more users to design and create AI enabled applications is provided. The AI platform comprises a data module configured to condition data received from a plurality of data sources to generate a corresponding data pipeline; wherein the data module comprises a plurality of reusable data components. The AI platform further comprises an intelligent processing module configured to process a plurality of datasets received on the data pipeline and generate a corresponding artificial intelligence (AI) pipeline; wherein the intelligent processing module comprises a plurality of reusable data processing components. The AI platform further includes a communication module configured to enable one or more users to select a set of reusable data components and set of reusable data processing modules and build a corresponding AI enabled application and an AI configuration module configured to seamlessly integrate the selected set of reusable data components and the set of reusable data processing components using a plurality of standardized interfaces.

15 Claims, 10 Drawing Sheets

(56) References Cited

U.S. PATENT DOCUMENTS

| | | | |
|---|---|---|---|
| 2017/0293840 A1* | 10/2017 | Ceugniet | G06N 5/003 |
| 2017/0330081 A1* | 11/2017 | Lindsley | G06F 16/9024 |
| 2019/0113973 A1* | 4/2019 | Coleman | H04L 12/16 |
| 2019/0130305 A1* | 5/2019 | Sivertson | G06N 20/00 |
| 2019/0324780 A1* | 10/2019 | Zhu | G06F 3/011 |
| 2020/0175961 A1* | 6/2020 | Thomson | G10L 15/28 |
| 2020/0184017 A1* | 6/2020 | Batra | G06F 40/295 |
| 2021/0397482 A1* | 12/2021 | Lantz | G06N 3/063 |
| 2022/0160309 A1* | 5/2022 | Poltorak | A61B 5/6823 |
| 2022/0292393 A1* | 9/2022 | Srivastava | G06N 5/043 |
| 2022/0300268 A1* | 9/2022 | Satheesh | G06N 20/00 |
| 2022/0300850 A1* | 9/2022 | Mendez | G06N 5/04 |

\* cited by examiner

FIG. 3

ARTIFICIAL INTELLIGENCE PLATFORM

PRIORITY STATEMENT

The present application claims priority under 35 U.S.C. § 119 to Indian patent application number 201941003173 filed 25 Jan. 2019, the entire contents of which are hereby incorporated herein by reference.

FIELD

The invention relates generally to Artificial Intelligence (AI) platforms and more particularly to a system and method for designing and creating AI enabled applications.

BACKGROUND

Artificial Intelligence (AI) has emerged as one of the most promising and in-demand capabilities for achieving any number of goals from enabling new and different offerings to improving speed, quality and efficiency of existing products and services. AI represents a diverse set of tools and technologies.

The major role of artificial intelligence (AI) is to design intelligent agent modules for analysing data intelligently and storing data in order to further use the analysed results. It includes toolsets and frameworks based on mathematical models, requirements-driven developments and reverse engineering software management (configurations and projects), and code drivers (generators, analyzers, and visualizers). An architecture for advanced analytics need to cover three main domains, data, discovery and deployment.

Creating an architecture to support AI is about creating a modern platform for advanced analytics and being able to support all steps of the analytics lifecycle. Such AI lifecycle activities may include Data Engineering, Data Science, Software Engineering, Application design and development and automated deployment to production with monitoring. However, such techniques may not account for standardized management for entire AI lifecycle activities. As a result, this will lead to re-inventing the cycle for every engagement, dependent and increases the noise and errors, thus increasing the time to deliver the solution.

Data-driven enterprises focus on building different types of AI but they face some common challenges. Duplication of effort, low value tasks, reproducibility and reusability prove to be some of the costly activities. Moreover, collaboration among various modules such as data engineering, data scientist and software engineer need to be more effective. In certain cases, AI projects are time consuming. This could be due to a number of recurring obstacles, including not having a consistent platform, or due to lack of accurate data for training the AI, while some may be unable to identify and manage a set of highly dynamic use cases.

Certain business platforms use AI technique platforms that involve the entire AI lifecycle and may not consider standardized interface for data engineering and data science, and software and user interface deployment activities. Moreover, such existing application may not account for unified mechanism to track experiments and compare scores during machine learning process.

Thus, there is a need for a standardized framework for managing and accelerating the full life cycle of AI activities that can allow users to create and develop functional applications by linking with AI along with customized user interface. This in turn would provide organizations a structured and flexible way to create AI-driven solutions over the long term.

SUMMARY

Briefly, according to one embodiment of the present technique, an AI platform is provided to enable one or more users to design and create AI enabled applications. The AI platform comprises a data module configured to condition data received from a plurality of data sources to generate a corresponding data pipeline; wherein the data module comprises a plurality of reusable data components. The AI platform further comprises an intelligent processing module configured to process a plurality of datasets received on the data pipeline and generate a corresponding artificial intelligence (AI) pipeline; wherein the intelligent processing module comprises a plurality of reusable data processing components. The AI platform further includes a communication module configured to enable one or more users to select a set of reusable data components and set of reusable data processing modules and build a corresponding AI enabled application and an AI configuration module configured to seamlessly integrate the selected set of reusable data components and the set of reusable data processing components using a plurality of standardized interfaces.

In another embodiment, a method for enabling one or more users to design and create AI enabled applications is procided. The method comprises creating an AI enabled application by selecting a plurality of reusable components configurable across a plurality of abstraction layers; wherein the plurality of reusable components are selected based on a specific business function, configuring the selected reusable components to seamlessly integrate to generate the AI application and executing a plurality of experiments using the selected reusable components by applying various conditions. The method further includes monitoring the plurality of experiments in real time to determine the optimum experiment for the selected business function.

BRIEF DESCRIPTION OF THE FIGURES

FIG. 3 is a screenshot indicating a manner in which a new data cartridge is created, according to aspects of the present technique;

DETAILED DESCRIPTION OF EXAMPLE EMBODIMENTS

Figure 1:
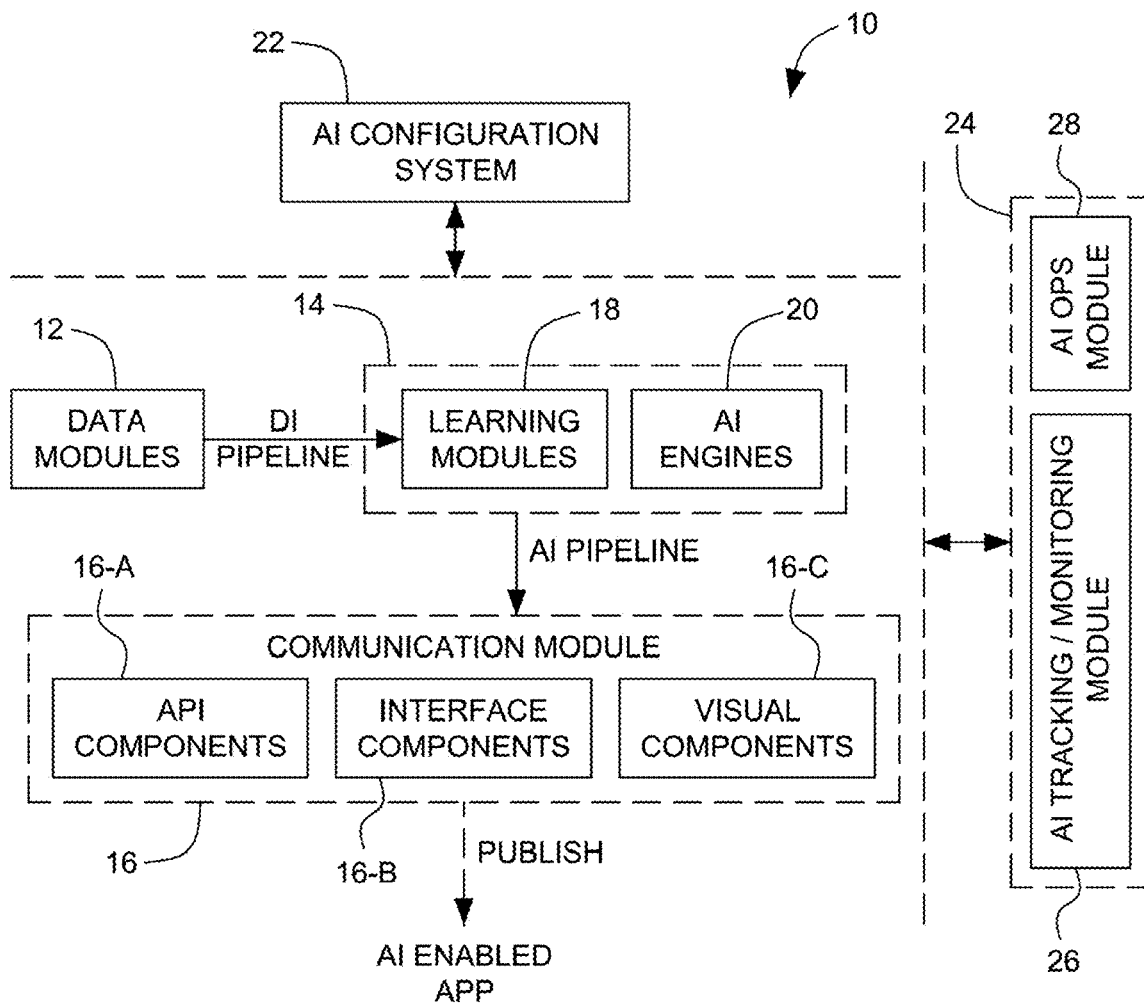
FIG. 1 is a block diagram of one embodiment of an artificial intelligence platform implemented according to various aspects of the present technique.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

FIG. 1 is a block diagram of one embodiment of an artificial intelligence (AI) platform implemented according to various aspects of the present technique. The artificial intelligence platform 10 comprises data module 12, an intelligent processing module 14, communication module 16, AI configuration system 22 and AI lifecycle monitoring system 24. As used herein, each module comprises a plurality of reusable components. The reusable components are selected by one or more users based on a business requirement. Each module is described in further detail below.

Data modules 12 is configured to manage data received from a plurality of sources and build a corresponding data pipeline. The data module comprises a plurality of reusable data components and is configured to condition the received data, which is then provided to the intelligent processing module 14.

Intelligent processing module 14 is configured to process the conditioned data and generate a corresponding AI pipeline that is then readily available to generate the AI enabled application. The intelligent processing module 14 comprises learning components 18 and AI engines 20. Learning components 18 is configured to generate and train multiple learning models which are derived from the data conditioned by the data modules 12. Artificial intelligence (AI) engines are configured to build, publish and monitor an AI pipeline from the learning models generated by learning components 18.

Communication module 16 is configured to enable a user to select reusable components from the data modules 12 and the intelligent processing modules 14 to generate an AI enabled application. The communication module 16 comprises API components 16-A, interface components 16-B and visual components 16-C. The selected reusable components are coupled together using standardized interfaces and is performed by the AI configuration system 22. Each reusable component has a set of defined properties such as attributes as well as interface parameters that allow it to be coupled with the other reusable components.

AI application lifecycle system is configured to track and monitor the operations of the AI platform 10. The AI application lifecycle system includes a tracking/monitoring module 26 and an operations module 28. The AI tracking/monitoring 26 module is configured to track and monitor a plurality of experiments that are being executed across the data modules and the intelligent processing module. The tracking module enables continuous performance monitoring on an ongoing basis as well as the ability to learn and improve the different reusable components when new patterns are detected.

Operations module 28 is configured to track and monitor the various operations performed across the lifecycle of the AI enabled application—that is across the data module, the intelligent processing module and the communication module. Operations module 28 is further configured to enable multiple activities required to move an AI application from development to testing to production with a continuous mode of delivery and deployment.

As described above, the various modules of AI platform include several reusable components seamlessly coupled together. The reusable components of the data module are described in further detail below.

Figure 2:
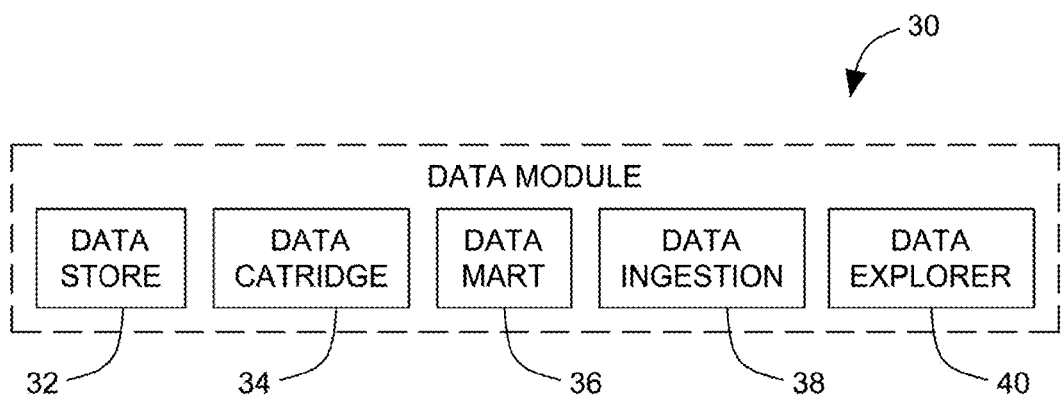
FIG. 2 is a block diagram of one embodiment of a data module implemented according to various aspects of the present technique.

FIG. 2 is a block illustrating one embodiment of a data module implemented according to aspects of the present technique. The data module 30 comprises a plurality of reusable data components that configured to receive and condition a plurality of datasets for further use. The reusable data components comprises data store 32, data cartridge 34, data mart 36, data ingestion 38 and data explorer 40. Each components is described in further detail below.

Data store component 32 is configured to receive data from a plurality of data sources such as batch data from databases, various file formats, existing enterprise systems as well as real time streaming data sources and condition for use by the intelligent processing module. The data store allows users to preview various datasets and analyse the datasets as required.

Figure 3:
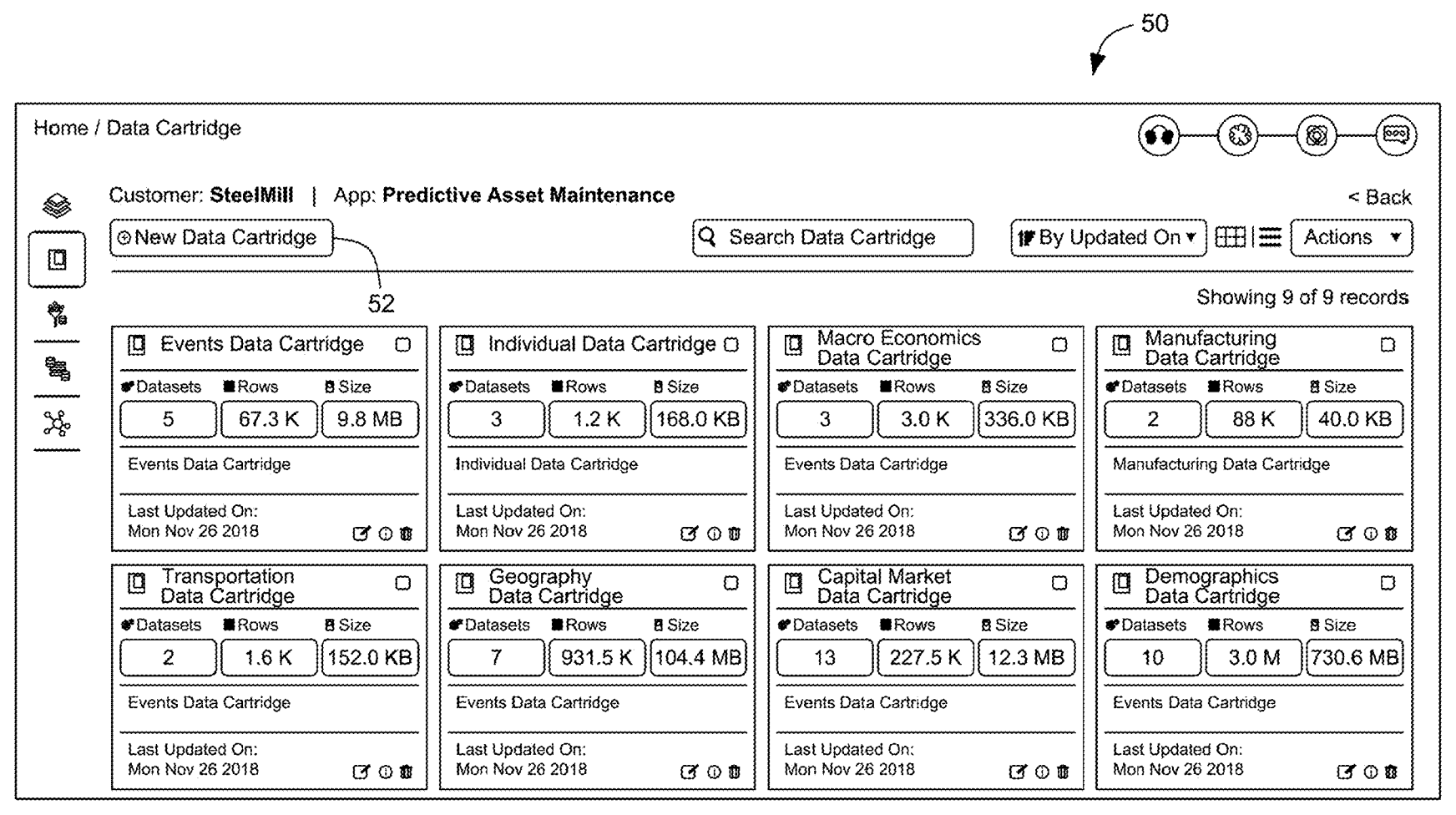

Data cartridge component 36 is configured to enable users to select and register a dataset from a list of various pre-curated external datasets. Data cartridge component 36 is configured to enable users to view registered dataset and additionally allows the user to create a new dataset based on a requirement as shown in FIG. 3. In the example screenshot, a user created a new data cartridge by clicking on tab 82. In one embodiment, the user creates a new dataset by defining a schema which is imported from a database tool such as an excel sheet.

Figure 4:
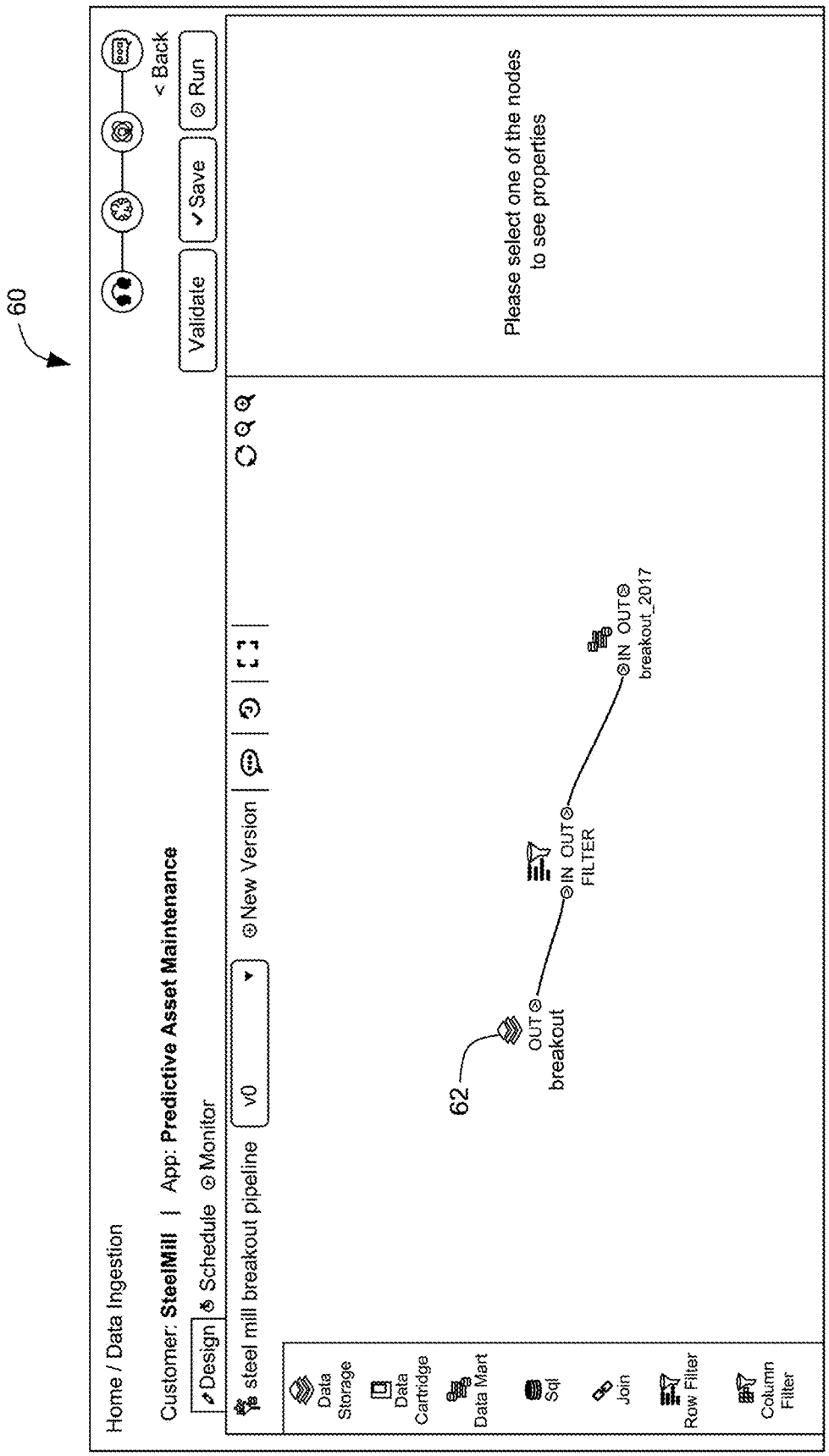
FIG. 4 is a screeshot depicting an example data pipeline, implemented according to aspects of the present technique.

Data ingestion component 38 is configured to enable users to create a data pipelines. An example data pipeline 92 is shown in FIG. 4. The user may perform transformations like combining two datasets or applying filters on a selected dataset provided by the datastore and data cartridge. In one embodiment, the transformed datasets are then moved to the data mart, where users can perform further transformations as required.

Data explorer component 40 is configured to enable users to perform exploratory data analysis on the datasets to determine trends and anomalies within the dataset. In one embodiment, data explorer component 40 is configured to provide a preview of the data and the schema of a dataset. Further, the data explorer component is configured to enable the users to visually present the datasets in the form of graphs and charts. In a further embodiment, data explorer component 40 is configured to enable the user to employ interactive tools such as Python Jupyter notebooks, to generate advanced visual representations of the datasets.

Figure 5:
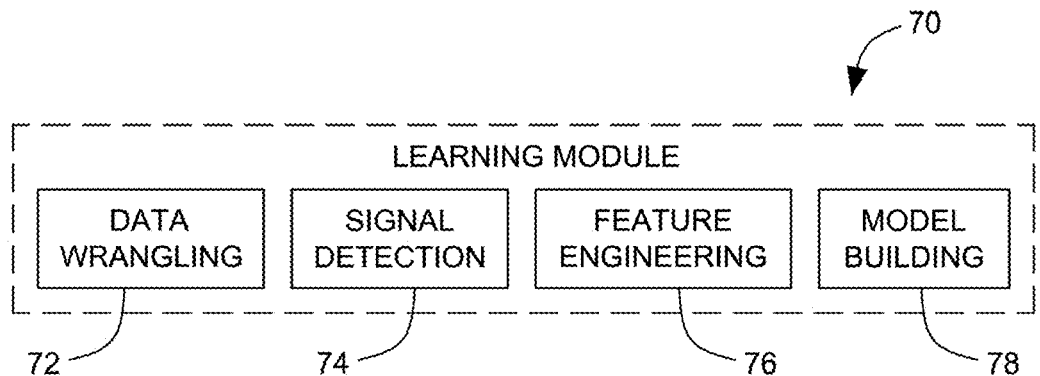
FIG. 5 is a block diagram of one embodiment of a learning module implemented according to various aspects of the present technique.

FIG. 5 is a block diagram of an embodiment of a learning module implemented according to aspects of the present technique. Learning module 50 comprises data wrangling component 52, signal detection component 54, feature engineering component 56 and model building component 58. Each component is described in further detail below.

Figure 6:
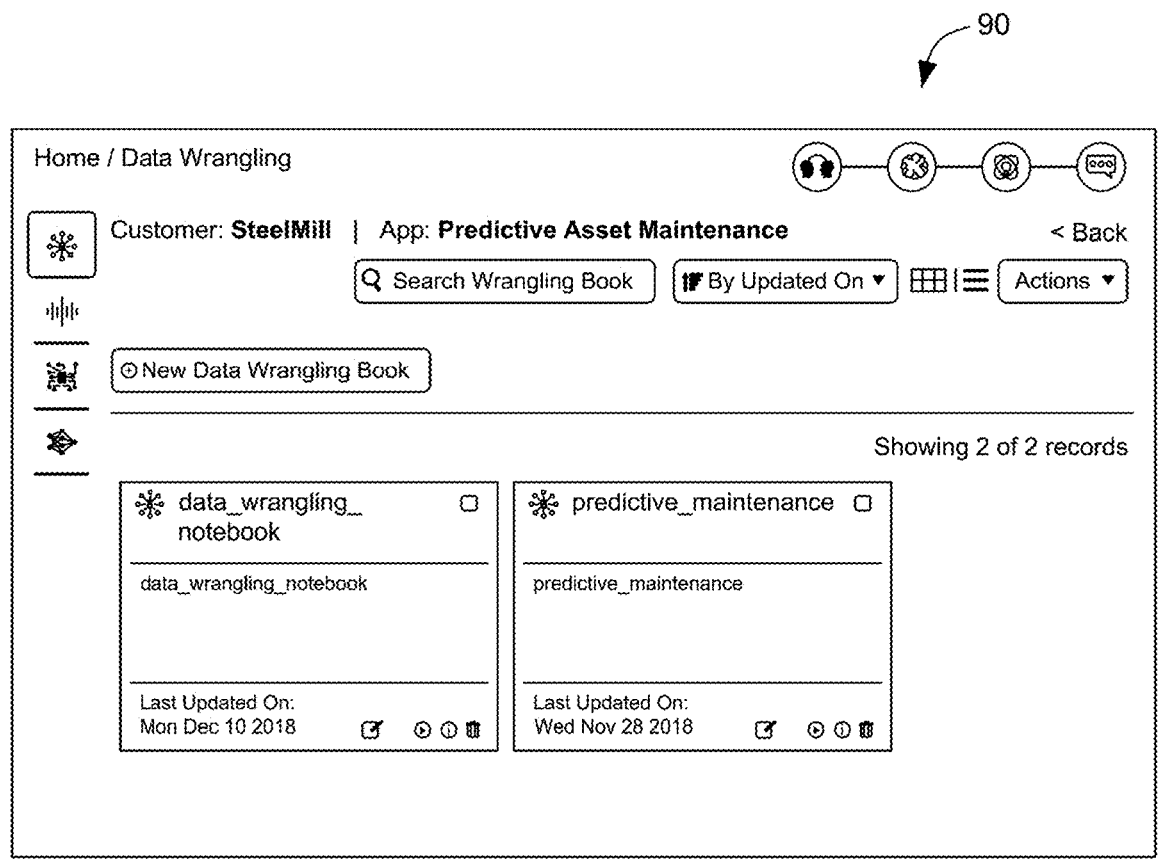
FIG. 6 is an example screenshot of a data wrangling component, implemented according to aspects of the present technique.

Data wrangling component 52 is configured to transform datasets (received from the data mart component, for example) into a more refined set. In one embodiment, these transformations are applied to distinct entities of data such as fields, rows, columns, data values etc. with specific actions like extractions, parsing, joining, standardizing, augmenting, cleansing, consolidating and filtering to create a refined output dataset for further use. An example screenshot 100 of the data wrangling component is shown in FIG. 6.

Figure 7:
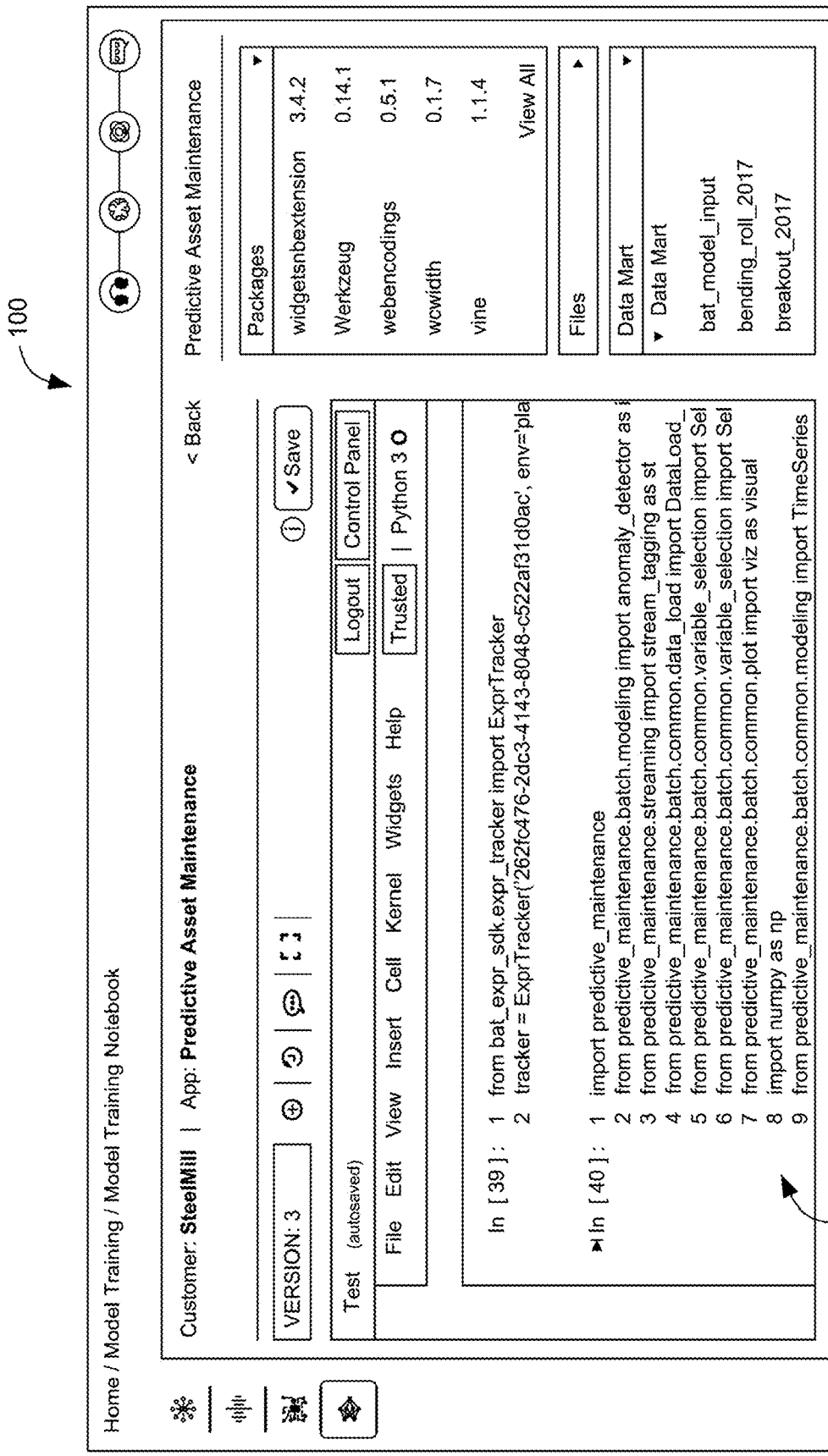
FIG. 7 is an example screenshot of a model training component, implemented according to aspects of the present technique.

Signal detection components is configured to identify patterns within datasets. For example, the signal detection components is configured to determine the factors that are responsible for variation in sales. In one embodiment, interactive computational tools such as Jupyter notebooks are used to determine the desired factors. Signal detection is enabled by a set of interactive components such as data reusable data science packages, functions, code libraries. Signal detection goes thru an iterative process where multiple versions, trials and experiements are run, compared and fine tuned to produce the appropriate set of feature components Feature engineering component 56 is configured to analyze a variance in different parameters in response to applying complex calculation and constraints to the datasets. For example, the feature engineering component determines the variance in sales while applying with complex constraints such as moving average, Fourier domain, etc. The feature engineering module creates feature components that are predictive of certain responses. Each feature component is tested on the basis of one or many tests of data science significance. The feature engineering is enabled by a set of interactive components such as data reusable data science packages, functions, code libraries. Feature engineering goes thru an iterative process where multiple versions, trials and experiements are run, compared and fine tuned to produce the appropriate set of feature components Model training component 58 is configured train and test data science and artificial intelligence algorithms to produce model components derived from the datasets generated by the reusable data components of data smodule as well as the from the data wrangling, signal detection and feature engineering components. The model training is enabled by a set of interactive components such as data reusable data science packages, functions, code libraries and the like. Model training goes through an iterative process where multiple versions, trials and experiements are run, compared and fine tuned to produce the appropriate set of model components 30. An example screenshot of the model training component 58 is shown in FIG. 7. As can be seen from FIG. 7, the interactive component used in this example is implemented using Jupyter Notebooks.

Figure 8:
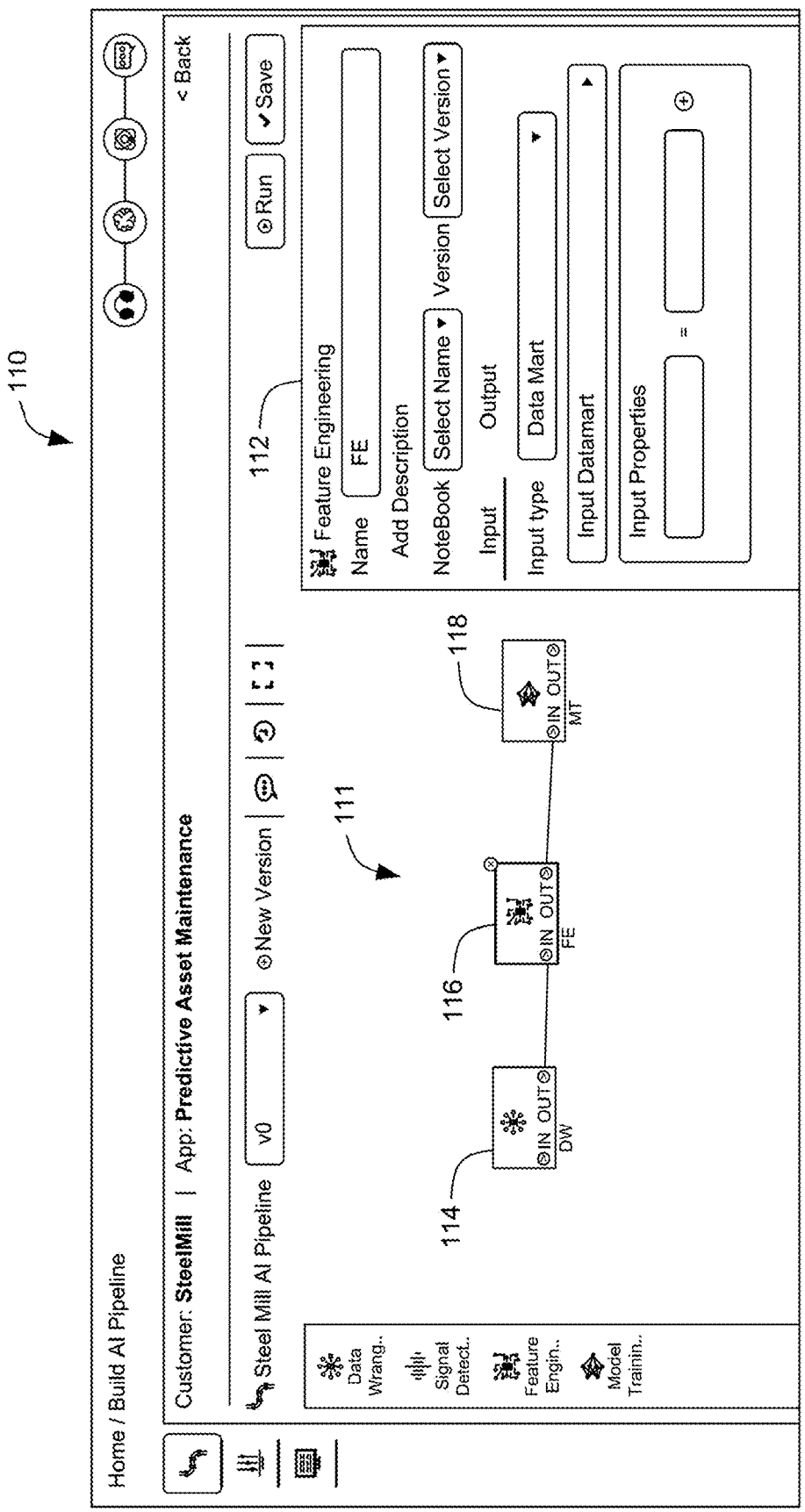
FIG. 8 is an example screenshot of an artificial intelligence pipeline, implemented according to aspects of the present technique.
Figure 9:
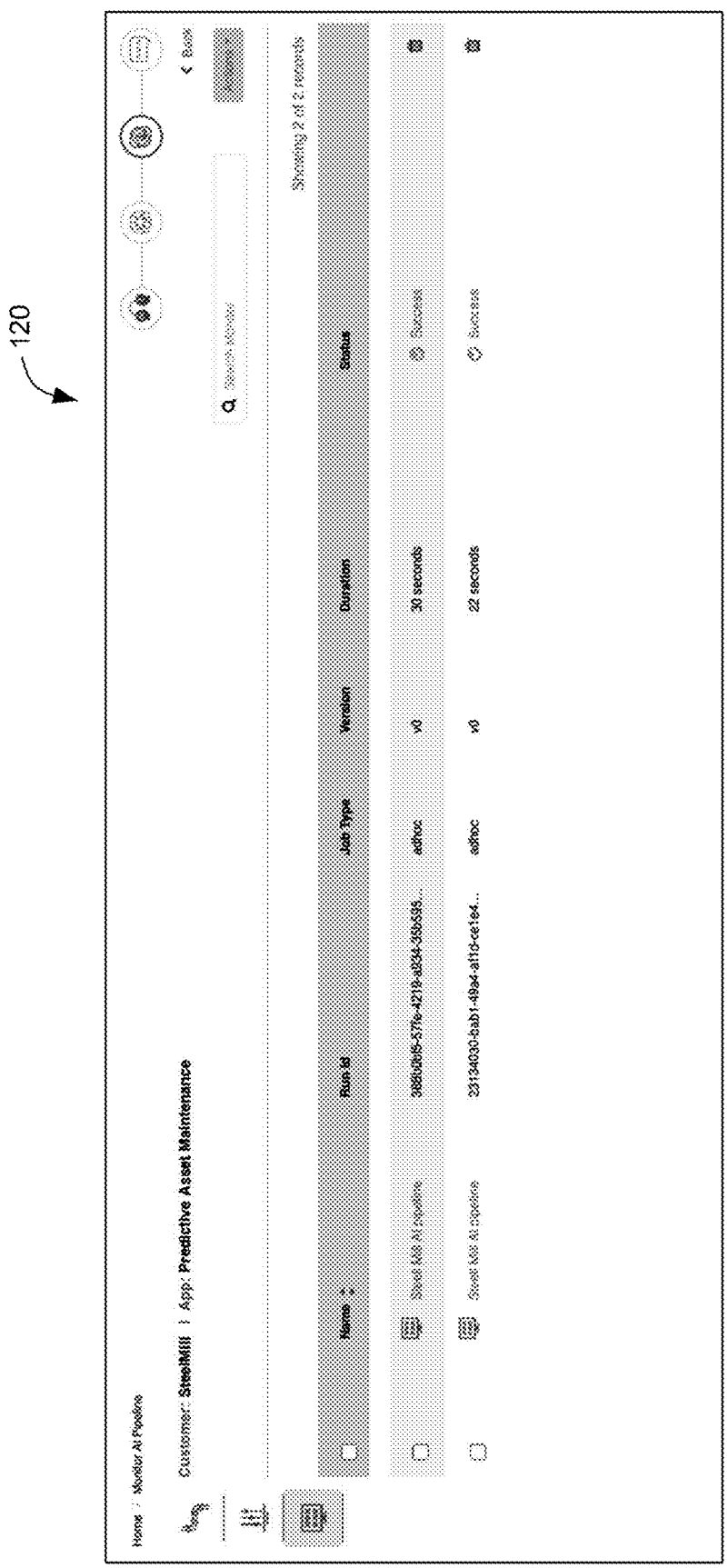
FIG. 9 is an example screenshot depicting a manner in which an AI pipeline is monitored, according to aspects of the present technique.

As described in FIG. 1, model components generated by the learning module is then used to create an AI pipeline. An example AI pipeline 112 is shown in a build AI pipeline screen shot in FIG. 8. The AI pipeline is generated by using the components of the learning module—that is the data wrangling component 114, feature engineering component 116 and the model training component 118. The parameters of the all components may be configured as shown in the box labelled 120. Once the AI pipeline is built, it is then published and monitored as shown in screenshot 130 of FIG. 9. The AI enabled applications built using a communication module as described in FIG. 1. The communication module is described in further detail below.

Figure 10:
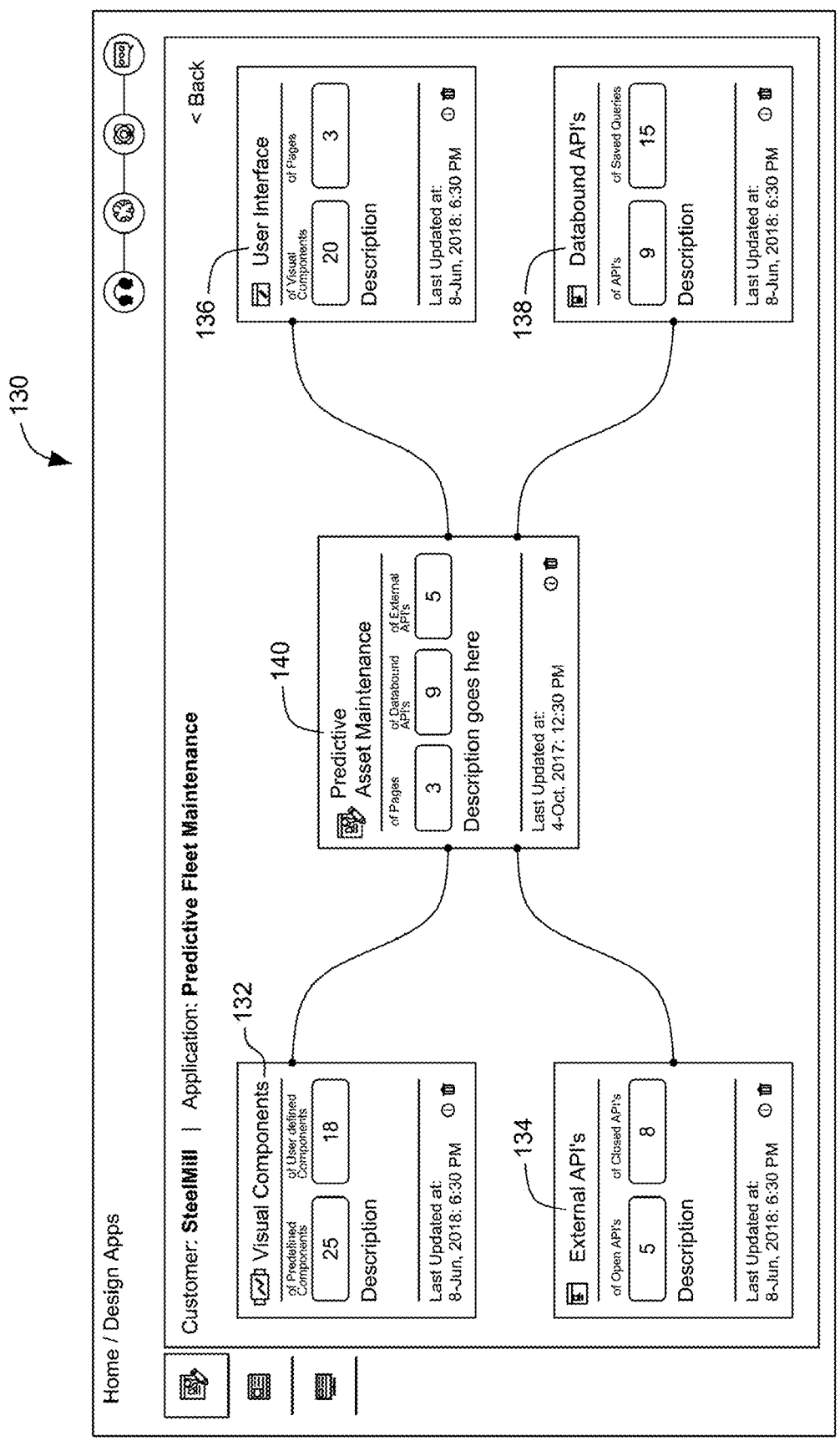
FIG. 10, FIG. 11 and FIG. 12 are example screenshot of an example communication module implemented according to aspects of the present technique.
Figure 11:
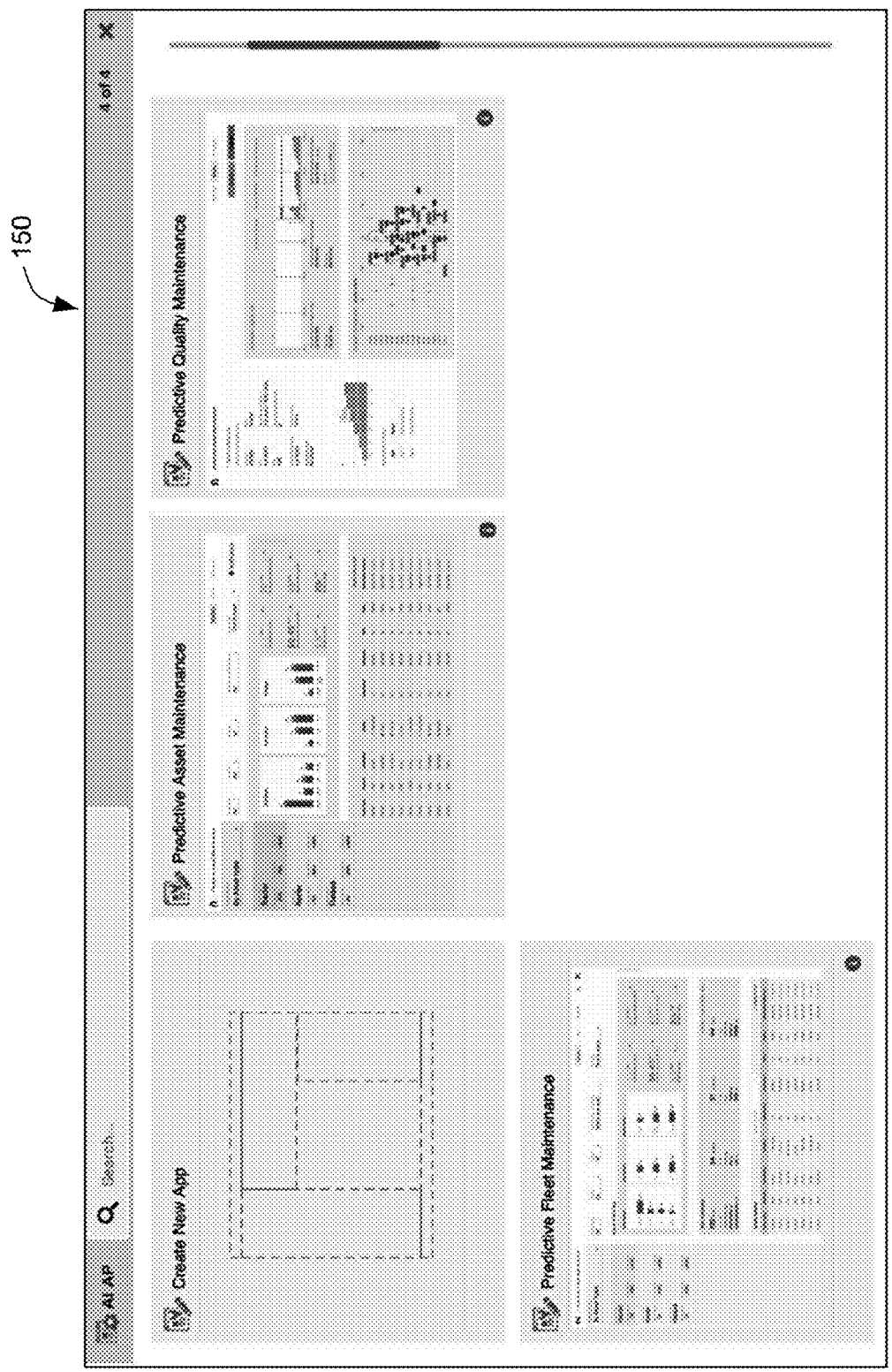
Figure 12:
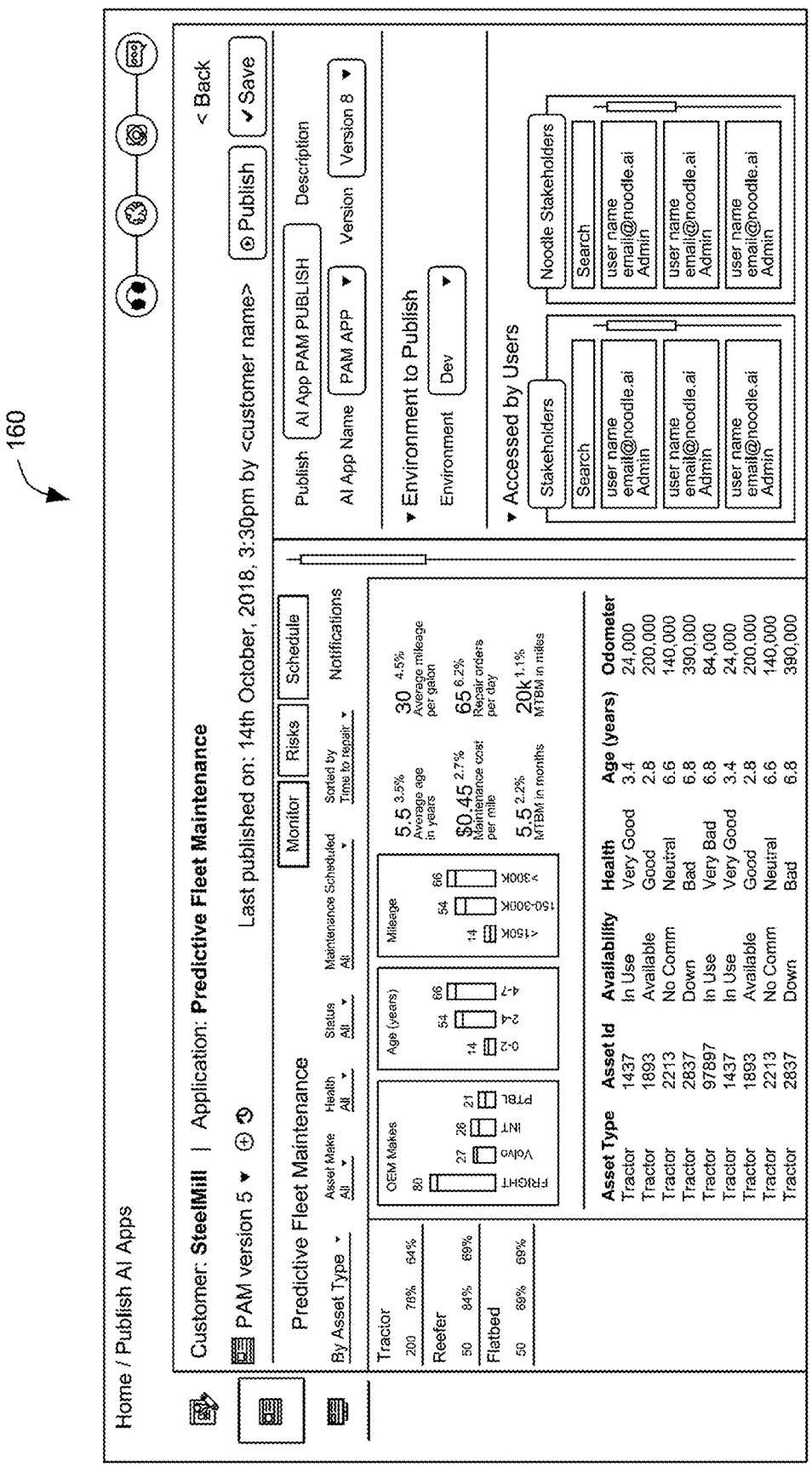

FIG. 10 is an example screenshot of a communication module configured to enable a user to configure the communication components for building the AI enabled application. The screenshot 130 illustrates various communication components namely the visual components 132, the external APIs component 134, the user interface component 136 and the databound APIs 138. These components are used to configure a predictive asset maintenance application, for example, as shown in FIG. 10. The user may create a new applications or modify existing application as shown in screenshot 140 of FIG. 11. It may be noted that each components is configurable based on a plurality of parameters. These parameters may be provided by the user or set at a default value. After all parameters are entered and monitored, the AI application is published as shown in screenshot 150 of FIG. 12.

The above described techniques provide many advantages including accelerating the speed of configuration and activation of AI applications that require continuous learning, monitoring, tracking and configuration of components across different aspects. Further, the above described technique reduces operational costs and hurdles and eases ongoing improvements and maintenance. It also facilitates standardization, reuse, productivity, capture IP of AI components across the organization. The use of standardised interfaces reduces Reduces friction and streamlines hand-off s between various activities Data Engineering, Data Science, Software automation and user interface design. The AI platform described herein also captures Knowledge and IP across all layers (audibility and transparency of all activities and components).

The afore mentioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The invention claimed is:
1. An artificial intelligence (AI) platform configured to:
select, via a customizable set of user interfaces, (i) one or more datasets from among a plurality of other datasets, (ii) a plurality of data conditioning components, and

(iii) a plurality of data learning components, wherein one or more of the selections is based on a business function related to a user making the selections; and communicably couple the selected components such that a pipeline generates and trains one or more machine learning models using the one or more selected datasets received from at least one external data source, wherein the one or more trained machine learning models are deployed to solve the related business function.

2. The AI platform of claim 1, wherein the AI platform comprises application programming interface (API) components and interface components.

3. The AI platform of claim 1, wherein the selection of the data conditioning components is performed from among a data store component, a data cartridge component, a data mart component, a data ingestion component and a data explorer component.

4. The AI platform of claim 1, wherein the selection of the data learning components is performed from among a data wrangling component, a signal detection component, a feature engineering component and a model building component.

5. The AI platform of claim 4, wherein the selected data learning components are configured to employ interactive computational tools.

6. The AI platform of claim 1, wherein the AI platform comprises an AI engine configured to, publish and monitor the pipeline.

7. The AI platform of claim 6, wherein the AI engine is configured to run a plurality of experiments using combinations of data modules and learning models.

8. The AI platform of claim 1, wherein the pipeline is created using a single click and publish feature.

9. The AI platform of claim 1, wherein the customizable set of user interfaces is designed to support 'drag and drop' functions.

10. The AI platform of claim 6, wherein the monitoring is of a lifecycle of the one or more machine learning models.

11. The AI platform of claim 6, wherein the monitoring compares experiments being executed in real-time and enables one or more users to alter one or more input parameters for the live experiments.

12. The AI platform of claim 1, wherein a customization of the set of user interfaces is automatic.

13. A method for enabling one or more users to design and create AI enabled applications, the method comprising:
  selecting, via a customizable set of user interfaces, (i) one or more datasets from among a plurality of other datasets, (ii) a plurality of data conditioning components, and (iii) a plurality of data learning components, wherein one or more of the selections is based on a business function related to a user making the selections; and
  communicably coupling the selected components such that a pipeline trains one or more machine learning models using the one or more selected datasets received from at least one external data source, wherein the one or more trained machine learning models are deployed to solve the related business function.

14. The method of claim 13, further comprising:
  building, publishing, and monitoring an AI pipeline using a plurality of AI engines configured to:
    recognise data patterns in a plurality of data models;
    apply a plurality of conditions on the data models and predict corresponding outcomes; and
    recommend a set of solutions based on the predicted outcomes.

15. The AI platform of claim 13, wherein the pipeline enables one or more users to design and create AI enabled applications using a single click and publish feature.

\* \* \* \* \*